US005571891A

United States Patent [19]

Jung et al.

[11] Patent Number: 5,571,891
[45] Date of Patent: Nov. 5, 1996

[54] AROMATIC COPOLYAMIDES, PRODUCTION THEREOF, FORMED STRUCTURES AND PRODUCTION THEREOF

[75] Inventors: Holger Jung, Niedernhausen; Richard Neuert, Winkelhaid; Peter Klein, Wiesbaden, all of Germany

[73] Assignee: Hoechst Aktiengesellschaft, Frankfurt, Germany

[21] Appl. No.: 417,305

[22] Filed: Apr. 5, 1995

[30] Foreign Application Priority Data

Apr. 6, 1994 [DE] Germany .......................... 44 11 757.4
Jun. 23, 1994 [DE] Germany .......................... 44 21 885.0

[51] Int. Cl.⁶ .................................. C08G 73/10; C08G 69/12
[52] U.S. Cl. ........................ 528/310; 528/183; 528/184; 528/190; 528/191; 528/329.1; 528/331; 528/340; 528/344; 428/395; 428/396; 428/474.4; 264/211.12; 264/211.17
[58] Field of Search ................................ 528/183, 184, 528/190, 191, 310, 329.1, 331, 340, 344; 428/396, 395, 474.5; 264/211.12, 211.17

[56] References Cited

U.S. PATENT DOCUMENTS 5,266,672 11/1993 Miess et al. .......................... 528/184

Primary Examiner—James J. Seidleck
Assistant Examiner—P. Hampton-Hightower
Attorney, Agent, or Firm—John M. Genova

[57] ABSTRACT

Aromatic copolyamides, production thereof, formed structures and production thereof Described are aromatic copolyamides comprising the structural repeat units of the formulae I, II and III

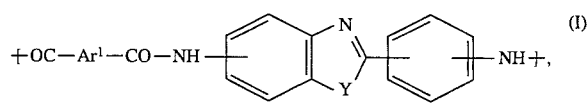

$$\text{+OC}-\text{Ar}^2-\text{CO}-\text{NH}-\text{Ar}^3-\text{NH+}, \text{ and} \quad \text{(II)}$$

$$\text{+OC}-\text{Ar}^4-\text{CO}-\text{NH}-\text{Ar}^5-\text{NH+} \quad \text{(III)}$$

where $Ar^1$, $Ar^2$, $Ar^3$ and $Ar^4$ are independently of one another bivalent aromatic radicals whose valence bonds are disposed para or comparably coaxial or parallel to each other, 43 Claims, No Drawings

AROMATIC COPOLYAMIDES, PRODUCTION THEREOF, FORMED STRUCTURES AND PRODUCTION THEREOF

FIELD OF THE INVENTION

The present invention relates to novel aromatic copolyamides which are spinnable from their solutions in organic solvents and to structures formed therefrom, and also to processes for their production.

BACKGROUND ART

Aromatic polyamides (aramids) are known raw materials of high thermal and chemical stability and low flammability. For instance, fibers and sheets of such raw materials have very good mechanical properties, such as high strength and high initial modulus (modulus of elasticity), and are highly suitable for technical applications, for example for reinforcing plastics or for use as filter materials.

It is known that filaments or fibers can be produced from polyaramides with high strength and high initial modulus if the amide bonds on the aromatic nuclei are coaxial or almost parallel to each other, forming rigid, rodlike polymer molecules.

A typical polyamide of this kind is for example poly-(p-phenyleneterephthalamide). Filaments made of this material are described for example in German Patent 2,219,703.

This polyamide has a number of advantages, but its production and its processing are very difficult. Because this polymer is insoluble in polar organic solvents, even in the presence of inorganic salts, such as calcium chloride or lithium chloride, as solubilizers, this polymer, once formed, will quickly precipitate even from the reaction medium. It has to be isolated, washed, dried and then redissolved in a spinning solvent. The preferred solvent for preparing spinning solutions is concentrated sulfuric acid, which presents special problems with handling (safety, corrosion) and waste disposal.

Attempts have therefore been made to circumvent these difficulties by developing copolyamides which are readily soluble in the known amide solvents and which are also readily spinnable and whose filaments, after drawing, exhibit high strength values and initial moduli.

For instance, German Patent 2,556,883 and German Offenlegungsschrift 3,007,063 describe copolyamides of terephthalic acid, p-phenylenediamine and 3,4'-diaminodiphenyl ether, which, in amide solvents, form isotropic solutions of good spinnability. The filaments acquire high strengths and moduli on drawing to a very high draw ratio. The enhanced solubility is due here to the meta-orientation and the oxygen atom. Yet there continues to be a demand for aramids which are processable from known amide solvents into fibers having high strengths and moduli and which can be processed very economically into formed structures.

Also known are aramids comprising structural repeat units derived from 2-aminophenylamino-benzimidazole, -benzoxazole or -benzothiazole.

For instance, DE-B-2,530,875 (corresponding to U.S. Pat. No. 4,018,735) describes the production and processing of anisotropic forming solutions which contain such aromatic polyamides in high concentrations. There is a recommendation that the forming solution be produced using in particular concentrated sulfuric acid, but organic solvents are also mentioned. The aromatic polyamides described include copolyamides based on terephthalic acid, p-phenylenediamine and 5-amino-2-(p-aminophenyl)benzimidazole.

DE-B-2,211,241 discloses a process for producing high strength, heat-resistant fibers having a high modulus. It describes the spinning of aromatic polyamides containing heterocyclic units, including the spinning of a polyamide derived from 2,6-naphthalenedicarbonyl dichloride and 4,4'-diamine-2-phenylbenzoxazole.

DE-A-2,726,178 discloses a copolymer based on terephthalic acid, p-phenylenediamine and 5-amino-2-(p-aminophenyl)benzoxazole.

GB-A-1,341,945 discloses inter alia a polymer based on terephthalic acid and 6-amino-2-(p-aminophenyl)benzothiazole.

Furthermore, DE-C-2,208,811 describes aromatic polyamides derived from 2-aminophenylaminobenzimidazole and specific naphthalenedicarboxylic acids.

DISCLOSURE OF THE INVENTION

The present invention now provides aromatic copolyamides which are processible into formed structures having excellent properties, especially remarkably high initial moduli and tensile strengths, and which are notable for good solubility in organic solvents.

The present invention accordingly relates to aromatic copolyamides comprising the structural repeat units of the formulae I, II and III

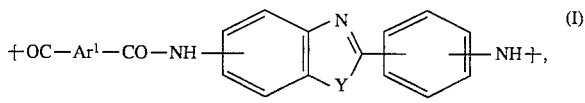

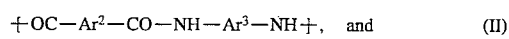

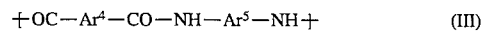

where $Ar^1$, $Ar^2$, $Ar^3$ and $Ar^4$ are independently of one another bivalent aromatic radicals whose valence bonds are disposed para or comparably coaxial or parallel to each other, $Ar^5$ is a non-$Ar^3$ bivalent aromatic radical whose valence bonds are disposed para or comparably coaxial or parallel to each other, or $Ar^5$ is a bivalent aromatic radical whose valence bonds are disposed meta or comparably angled to each other, Y is —O—, —S— or —NR$^1$— where R$^1$ is a univalent organic radical or in particular hydrogen, and $Ar^1$, $Ar^2$, $Ar^3$, $Ar^4$ and $Ar^5$ are independently of one another optionally substituted by one or two radicals inert toward carbonyl chlorides.

Any substituents in $Ar^1$ to $Ar^5$ which are radicals inert toward carbonyl chlorides can be univalent inorganic radicals, such as halogen, or univalent organic radicals, such as alkyl, alkoxy, bis(N-alkyl)amino, bis(N-alkyl)amido or nitrile. The term "inert radical" means that these substituents do not react under the production and processing conditions of the copolyamides according to the present invention.

Preferred inert radicals are chlorine or $C_1$–$C_6$-alkyl or $C_1$–$C_6$-alkoxy.

Particularly preferred inert radicals are chlorine, methoxy or methyl.

Any bivalent aromatic radicals whose valence bonds are disposed para or comparably coaxial or parallel to each other can be monocyclic or polycyclic aromatic hydrocarbon radicals or heterocyclic aromatic radicals which can be monocyclic or polycyclic. Heterocyclic aromatic radicals have in particular one or two oxygen, nitrogen or sulfur atoms in the aromatic nucleus.

Polycyclic aromatic radicals can be fused to one another or be linearly connected to one another via C—C bonds or via a —CO—NH— group.

The valence bonds which are disposed coaxial or parallel to each other point in opposite directions. An example of coaxial bonds pointing in opposite directions are the bonds of 4,4'-biphenylylene. An example of parallel bonds pointing in opposite directions are the bonds of 1,5-naphthylene and 2,6-naphthylene, while the ones of 1,8-naphthylene are parallel but point in the same direction.

Examples of preferred bivalent aromatic radicals whose valence bonds are disposed para or comparably coaxial or parallel to each other include monocyclic aromatic radicals having mutually para-disposed free valences, especially 1,4-phenylene, or bicyclic fused aromatic radicals having parallel bonds pointing in opposite directions, especially 1,4-, 1,5- and 2,6-naphthylene, or bicyclic aromatic radicals linked via a C—C bond and having coaxial bonds point in opposite directions, especially 4,4'-biphenylylene.

Preferred radicals of this type are 1,4-phenylene and 2-chloro-1,4-phenylene.

Any bivalent aromatic radicals whose valence bonds are disposed meta or comparably angled to each other are monocyclic or polycyclic aromatic hydrocarbon radicals or heterocyclic aromatic radicals which can be monocyclic or polycyclic. Heterocyclic aromatic radicals have in particular one or two oxygen, nitrogen or sulfur atoms in the aromatic nucleus.

Polycyclic aromatic radicals can be fused to one another or be connected to one another via C—C bonds or via bridging groups, for example —O—, —CH$_2$—, —CO—NH—, —S—, —CO— or —SO$_2$—.

Examples of polycyclic aromatic radicals whose valence bonds are in an angled position comparable to the meta position are 1,6-naphthylene, 2,7-naphthylene and 3,4'-biphenylylene.

A preferred example of a monocyclic aromatic radical of this type is 1,3-phenylene.

The polyamides of the present invention may include substituted radicals and unsubstituted radicals side by side in varying proportions.

More particularly, the polyamide may contain one or more kinds of substituted radicals $Ar^1$ to $Ar^9$; it may for example contain methyl-substituted radicals exclusively or proportions of radicals having different alkyl substituents and/or having halogen substituents.

The polyamides of the present invention, however, may also exclusively contain substituted or unsubstituted radicals $Ar^1$ to $Ar^5$. Preference is given to those polyamides of the present invention which contain only unsubstituted or up to about 30 mol % of substituted radicals, based on the polymer.

$Ar^1$, $Ar^2$ and $Ar^4$ are each preferably 1,4-phenylene.

$Ar^3$ is preferably 1,4-phenylene or a bivalent radical derived from 4,4'-diaminobenzanilide.

$Ar^5$ is in particular a radical of the formula IV

$$—Ar^6—X—Ar^7— \quad (IV)$$

where $Ar^6$ and $Ar^7$ are independently of each other a bivalent aromatic radical whose valence bonds are disposed para or comparably coaxial or parallel to each other, or where $Ar^7$ is additionally a bivalent aromatic radical whose valence bonds are disposed meta or comparably angled to each other, or where $Ar^6$ and $Ar^7$ are independently of each other optionally substituted by one or two radicals inert toward carbonyl chlorides, and X is a direct C—C bond or a group of the formula —O—, —S—, —SO$_2$—, —O—phenylene—O— or alkylene.

In a further preferred form of the invention, $Ar^3$ can likewise be a radical of the formula IV which, in a particular case, will differ from the particular radical $Ar^5$ chosen.

Y is preferably —S— or —O—, but particularly preferably —NH—.

$R^1$ can be any desired univalent organic radical as long as it is inert under the production and processing conditions of the copolymer. Examples of $R^1$ are alkyl, cycloalkyl, aryl and aralkyl, preferably $C_1$–$C_6$-alkyl, especially methyl, and very particularly preferably hydrogen.

The copolyamides of the present invention are customarily readily soluble in organic solvents, such as organic polar and aprotic solvents. By readily soluble is meant having a solubility of at least 4 g of polymer in 100 ml of solvent (at 25° C.).

Particularly preferably the solvents used in producing and/or processing the copolyamides of the present invention are solvents of the amide type, for example N-methyl-2-pyrrolidone, N,N-dimethylacetamide, tetramethylurea, N-methyl-2-piperidone, N,N'-dimethylethyleneurea, N,N,N',N'-tetramethylmaleimide, N-methylcaprolactam, N-acetylpyrrolidine, N,N-diethylacetamide, N-ethyl-2-pyrrolidone, N,N'-dimethylpropionamide, N,N-dimethylisobutylamide, N-methylformamide, N,N'-dimethylpropyleneurea.

Preference is given to N-methyl-2-pyrrolidone, N,N-dimethylacetamide and a mixture thereof.

Preference is given to aromatic copolyamides comprising the structural repeat units of the formulae I, II and III where $Ar^1$, $Ar^2$ and $Ar^4$ are each 1,4-phenylene, $Ar^3$ is 1,4-phenylene or a bivalent radical of 4,4'-diaminobenzanilide, $Ar^5$ is a radical of the formula IV as defined above, $Ar^6$ is 1,4-phenylene optionally substituted by a radical inert toward carbonyl chlorides, $Ar^7$ is 1,4- or 1,3-phenylene optionally substituted by a radical inert toward carbonyl chlorides, and X is a direct C—C bond, —O—, —CH$_2$— or —O—1,4-phenylene—O—.

Very particular preference is given to aromatic copolyamides comprising the structural repeat units of the formulae I, II and III where $Ar^1$, $Ar^2$ and $Ar^4$ are each 1,4-phenylene, $Ar^3$ is 1,4-phenylene or a bivalent radical of 4,4'-diaminobenzanilide, $Ar^5$ is a radical of the formula IV as defined above, $Ar^6$ is 1,4-phenylene, $Ar^7$ is 1,3-phenylene and X is —O—, and where the proportions of the structural repeat units of the formulae I to III preferably vary within the following ranges, based on the total amount of these structural units:

structural repeat unit of the formula I: 1–50 mol %,
structural repeat unit of the formula II: 20–60 mol %, and
structural repeat unit of the formula III: 20–50 mol %.

Very particular preference is given to aromatic copolyamides comprising the structural repeat units of the formulae I, II and III where $Ar^1$, $Ar^2$ and $Ar^4$ are each 1,4-phenylene, $Ar^3$ is 1,4-phenylene or a bivalent radical of 4,4'-diaminobenzanilide, $Ar^5$ is a radical of the formula IV as defined above, $Ar^6$ and $Ar^7$ are each 1,4-phenylene and X is —O-13 1,4-phenylene—O— and where the proportions of the structural repeat units of the formulae I to III preferably vary within the following ranges, based on the total amount of these structural units:

structural repeat unit of the formula I: 1–60 mol %,
structural repeat unit of the formula II: 20–40 mol %, and structural repeat unit of the formula III: 10–40 mol %.

Very particular preference is given to aromatic copolyamides comprising the structural repeat units of the formulae I, II and III where Ar¹, Ar² and Ar⁴ are each 1,4-phenylene, Ar³ is 1,4-phenylene or a bivalent radical of 4,4'-diaminobenzanilide, Ar⁵ is a radical of the formula IV as defined above, Ar⁶ and Ar⁷ are each 1,4-phenylene substituted by a radical, especially methyl, methoxy or chlorine, inert toward carbonyl chlorides and X is a direct C—C bond and where the proportions of the structural repeat units of the formulae I to III preferably vary within the following ranges, based on the total amount of these structural units:

structural repeat unit of the formula I: 1–70 mol %, especially 30–60 mol % structural repeat unit of the formula II: 10–60 mol %, especially 10–30 mol %, and structural repeat unit of the formula III: 20–60 mol %, especially 30–60 mol %.

Preference is further given to aromatic copolyamides comprising the structural repeat units of the formulae I, II and III where Ar¹, Ar² and Ar⁴ are each 1,4-phenylene, Ar³ is a radical of the formula IV defined above where Ar⁶ and Ar⁷ are each 1,4-phenylene substituted by a radical, especially methyl, methoxy or chlorine, inert toward carbonyl chlorides, X is a direct C—C bond, Ar⁵ is a radical of the formula IV defined above where Ar⁶ is 1,4-phenylene optionally substituted by a radical inert toward carbonyl chlorides, Ar⁷ is 1,4- or 1,3-phenylene optionally substituted by a radical inert toward carbonyl chlorides, and X is —O—, —CH₂— or —O—1,4-phenylene—O—.

Very particular preference is given to aromatic copolyamides comprising the structural repeat units of the formulae I, II and III where Ar¹, Ar² and Ar⁴ are each 1,4-phenylene, Ar³ is a radical of the formula IV defined above where Ar⁶ and Ar⁷ are each 1,4-phenylene substituted by a radical, especially methyl, methoxy or chlorine, inert toward carbonyl chlorides, X is a direct C—C bond, Ar⁵ is a radical of the formula IV defined above where Ar⁶ is 1,4-phenylene, Ar⁷ is 1,3-phenylene and X is —O— and where the proportions of the structural repeat units of the formulae I to III preferably vary within the following ranges, based on the total amount of these structural units:

structural repeat unit of the formula I: 1–60 mol %,
structural repeat unit of the formula II: 20–50 mol %, and
structural repeat unit of the formula III: 20–40 mol %.

Very particular preference is given to aromatic copolyamides comprising the structural repeat units of the formulae I, II and III where Ar¹, Ar² and Ar⁴ are each 1,4-phenylene, Ar³ is a radical of the formula IV defined above where Ar⁶ and Ar⁷ are each 1,4-phenylene substituted by a radical, especially methyl, methoxy or chlorine, inert toward carbonyl chlorides, X is a direct C—C bond, Ar⁵ is a radical of the formula IV defined above where Ar⁶ and Ar⁷ are each 1,4-phenylene and X is —O—1,4-phenylene—O— and where the proportions of the structural repeat units of the formulae I to III preferably vary within the following ranges, based on the total amount of these structural units:

structural repeat unit of the formula I: 1–60 mol %,
structural repeat unit of the formula II: 20–50 mol %, and
structural repeat unit of the formula III: 20–40 mol %.

A further preferred embodiment of the invention relates to aromatic copolyamides comprising the structural repeat units of the formulae I, II, III and V

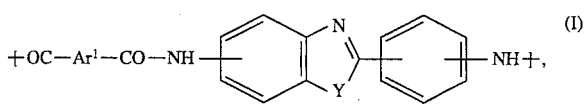

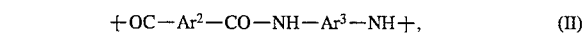

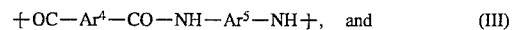

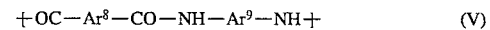

where Ar¹, Ar², Ar³, Ar⁴ and Ar⁸ are independently of one another bivalent aromatic radicals whose valence bonds are disposed para or comparably coaxial or parallel to each other, Y is as defined above, and Ar⁵ and Ar⁹ are each independently of each other different radicals of the formula IV

where Ar⁶, Ar⁷ and X are each as defined above.

Preference is given to aromatic polyamides comprising the structural repeat units of the formulae I, II, III and V where Ar¹, Ar², Ar⁴ and Ar⁸ are each 1,4-phenylene, Ar³ is 1,4-phenylene or a bivalent radical of 4,4'-diaminobenzanilide, Ar⁶ is 1,4-phenylene optionally substituted by a radical, especially by methyl, methoxy or chlorine, inert toward carbonyl chlorides, Ar⁷ is 1,4- or 1,3-phenylene optionally substituted by a radical, especially methyl, methoxy or chlorine, inert toward carbonyl chlorides and X is a direct C—C bond, —O—, —CH₂— or —O—1,4-phenylene—O—.

Very particular preference is given to aromatic copolyamides comprising the structural repeat units of the formulae I, II, III and V where Ar¹, Ar², Ar⁴ and Ar⁸ are each 1,4-phenylene, Ar³ is 1,4-phenylene or a bivalent radical of 4,4'-diaminobenzanilide, Ar⁵ is a radical of the formula IV where Ar⁶ and Ar⁷ are each 1,4-phenylene and X is —O—1,4-phenylene—O— and Ar⁹ is a radical of the formula IV where Ar⁶ is 1,4-phenylene, Ar⁷ is 1,3-phenylene and X is —O—, and where the proportions of the structural repeat units of the formulae I to III and V in particular vary within the following ranges, based on the total amount of these structural units:

structural repeat unit of the formula I: 1–15 mol %,
structural repeat unit of the formula II: 40–60 mol %,
structural repeat unit of the formula III: 1–30 mol %, and
structural repeat unit of the formula V: 15–45 mol %.

Very particular preference is given to aromatic copolyamides comprising the structural repeat units of the formulae I, II, III and V where Ar¹, Ar², Ar⁴ and Ar⁸ are each 1,4-phenylene, Ar³ is 1,4-phenylene or a bivalent radical of 4,4'-diaminobenzanilide, Ar⁵ is a radical of the formula IV where Ar⁶ and Ar⁷ are each 1,4-phenylene and X is —O—1,4-phenylene—O— and Ar⁹ is a radical of the formula IV where Ar⁶ and Ar⁷ are each 1,4-phenylene substituted by a radical, especially by methyl, methoxy or chlorine, inert toward carbonyl chlorides, and X is a direct C—C bond and where the proportions of the structural repeat units of the formulae I to III and V in particular vary within the following ranges, based on the total amount of these structural units:

structural repeat unit of the formula I: 1–15 mol %,
structural repeat unit of the formula II: 10–40 mol %,
structural repeat unit of the formula III: 10–35 mol %, and
structural repeat unit of the formula V: 30–60 mol %.

Very particular preference is given to aromatic copolyamides comprising the structural repeat units of the formulae I, II, III and V where $Ar^1$, $Ar^2$, $Ar^4$ and $Ar^8$ are each 1,4-phenylene, $Ar^3$ is 1,4-phenylene or a bivalent radical of 4,4'-diaminobenzanilide, $Ar^5$ is a radical of the formula IV where $Ar^6$ and $Ar^7$ are each 1,4-phenylene substituted by a radical, especially by methyl, methoxy or chlorine, inert toward carbonyl chlorides, and X is a direct C—C bond, and $Ar^9$ is a radical of the formula IV where $Ar^6$ is 1,4-phenylene, $Ar^7$ is 1,3-phenylene and X is —O— and where the proportions of the structural repeat units of the formulae I to III and V in particular vary within the following ranges, based on the total amount of these structural units:

structural repeat unit of the formula I: 1–15 mol %,
structural repeat unit of the formula II: 10–40 mol %,
structural repeat unit of the formula III: 30–60 mol %, and
structural repeat unit of the formula V: 10–35 mol %.

The novel copolyamides comprising the structural repeat units I, II and III or I, II, III and V are advantageously prepared by reacting a dicarbonyl dichloride of the formula VI or a mixture of such dicarbonyl dichlorides with a mixture of the diamines of the formulae VII, VIII and IX or VII, VIII, IX and X

(VI)

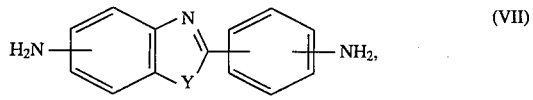

(VII)

(VIII)

(IX)

(X)

where $Ar^1$ to $Ar^9$ and Y are each as defined above.

The compounds of the formulae VI to X are known per se.

The proportions of the diamines VII, VIII and IX or VII, VIII, IX and X are in each case to be chosen so as to produce polyamides which are soluble in organic solvents, especially the compounds having the above-preferred proportions of structural units of the formulae I to III or I to IV.

It will be readily apparent to a person skilled in the art that the sum of all structural units derived from aromatic acids and the sum of all structural units derived from aromatic amines are essentially the same; that is, they differ by not more than about 1%, preferably by not more than about 0.2%, are in particular the same within the scope of the practical measuring and metering facilities.

The molecular weight of the polyamides being produced can be controlled inter alia via the choice of the mixing ratios of aromatic acids to aromatic amines. These selection criteria are known to any person skilled in the art of polycondensation.

Examples of suitable aromatic dicarboxylic acids from which the dicarbonyl dichlorides of the formula VI are derived are naphthalene-1,4-dicarboxylic acid, naphthalene-1,5-dicarboxylic acid, naphthalene-2,6-dicarboxylic acid, biphenyl-4,4'-dicarboxylic acid, 2-chloroterephthalic acid, 2-bromoterephthalic acid, 2-methylterephthalic acid and in particular terephthalic acid.

The diamine of the formula VII is for example diamino-2-phenylbenzoxazole, diamino-2-phenylbenzothiazole or preferably diamino-2-phenylbenzimidazole. Especially the 5,4'- and 6,4'-isomers thereof are preferred. Very particular preference is given to using 5(6)-amino-2-(p-aminophenyl)benzimidazole.

The diamine of the formula VIII is for example 4,4'-diaminobenzanilide, 2-chloro-p-phenylenediamine and preferably p-phenylenediamine.

The diamine of the formula IX or diamines of the formula X are, preferably 1,4-bis(4-aminophenoxy)benzene, 3,4'-diaminodiphenyl ether, 3,3'-dimethylbenzidine, 3,3'-dimethoxybenzidine or 3,3'-dichlorobenzidine.

The copolycondensation of the above-described monomeric compounds is generally carried out as a solution polycondensation.

For this, the aromatic monomeric compounds to be reacted with one another are generally dissolved in an organic solvent. The organic solvent preferably comprises at least one solvent of the amide type, as described above.

The preferred organic solvents of the process of the present invention are N-methyl-2-pyrrolidone, N,N-dimethylacetamide and a mixture thereof.

In a preferred form of carrying out the solution polymerization, the aromatic monomeric diamines are dissolved in an amide solvent. The solution thus obtained is then mixed with at least one aromatic monomeric compound in the form of an aromatic dicarbonyl dihalide by vigorous stirring in order that the copolymerization may be initiated.

In effect the amide solvent is used not only as solvent for the aromatic monomeric compounds and the aromatic copolyamide obtained therefrom but also as acid acceptor for a hydrogen halide, for example for hydrogen chloride, which is formed as a by-product of the copolymerization of the aromatic monomeric compounds. In some cases it can be advantageous to use a solubility-promoting additive, for example a metal halide of one of the metals of group I or II of the Periodic Table, which is added to the copolymerization mixture before, during or after the copolymerization.

Examples of such additives are alkali metal halides, such as lithium chloride, or alkaline earth metal halides, such as calcium chloride.

The polycondensation temperatures of the solution polymerization are customarily between $-20°$ C. and $+120°$ C., preferably between $+10°$ C. and $+100°$ C. Particularly good results are obtained at reaction temperatures between $+10°$ C. and $+80°$ C.

The sum of the concentrations of the aromatic monomeric compounds in the polymerization mixture solution can be adjusted having regard to the desired degree of polymerization, the desired viscosity of the polymerization mixture, the nature of the aromatic monomeric compounds used, the nature of the solvent used and the desired polymerization temperature. The most favorable sum of the concentrations can be determined on the basis of a number of preliminary experiments into the progress of the polymerization.

Polycondensation reactions are preferably carried out so that, on completion of the reaction, from 4 to 20, preferably from 5 to 10, % by weight of polycondensate are present in the solution.

As the polycondensation proceeds, the molecular weight of the polymer increases, as does the viscosity of the reaction batch.

An adequate molecular chain length will have been achieved for example when the viscosity of the polymer solution obtained in the course of the polymerization corresponds to an inherent viscosity of the polymer of more 2.5 dl/g, preferably 3.5 to 9.0 dl/g.

The inherent viscosity is defined by the expression $$\eta_{inh} = \frac{\ln \eta_{rel}}{c}$$

where $\eta_{rel}$ is the relative viscosity and c the concentration in g/100 ml.

For the purposes of the present invention, inherent viscosity is determined on 0.25% strength solutions of the polymer in N-methylpyrrolidone at 25° C.

The outlined, known process for preparing aromatic polyamides is insofar as it concerns the preparation of the above-described aromatic polyamides according to the present invention likewise part of the subject-matter of the present invention.

Once the polymer solution has achieved the viscosity required for further processing, the polycondensation can be stopped in a conventional manner by addition of monofunctional compounds, for example acetyl chloride. Thereafter the hydrogen chloride formed, which is salt-bound to the amide solvent, can be neutralized by addition of basic substances.

Suitable for this purpose are for example lithium hydroxide, calcium hydroxide, but in particular calcium oxide.

The aromatic copolyamide obtained on carrying out the process of the present invention can be collected from the copolymerization mixture by a process of separation, for example by precipitation. To prepare a solution for forming the copolyamide, the aromatic copolyamide thus isolated is then dissolved in a suitable organic solvent, this process being known as the dissolution process for preparing the forming solution.

In those cases where the aromatic copolyamide of the present invention is prepared using the process of solution polymerization, however, the copolyamide, since it is highly soluble in the solvent for polymerization, is present therein in a state of complete solution. In industrial use of the process of the present invention it is therefore advantageous that the mixture obtained in the course of the polymerization should immediately be used as forming solution for the aromatic copolyamide.

The aromatic copolyamide of the present invention is highly soluble in an organic solvent, for example in organic solvents of the amide type, and has excellent heat resistance and superior chemical resistance. The aromatic copolyamide of the present invention is particularly useful for producing various formed articles, for example fibers, films and coatings, which likewise form part of the subject-matter of the present invention.

The term "fibers" as used herein is to be understood in its broadest sense; it thus includes for example filaments or staple fibers of any linear density.

The term "films" as used herein is likewise to be understood in its broadest sense; it thus includes for example embodiments having different thicknesses, such as sheets or membranes.

These structures have not only excellent heat resistance and chemical resistance, but also superior mechanical properties, especially as regards tensile strength, flame resistance (high LOI values) and the modulus of elasticity. The solution of the aromatic copolyamide can likewise be used in various ways, for example for producing fibers, films, sheetlike elements, fibrous materials and other formed articles.

The invention therefore also provides formed structures, especially films and fibers, comprising the above-defined aromatic polyamides.

In a particularly preferred embodiment of the present invention, the formed structures are fibers having a tensile strength of more than 100 cN/tex, especially 150 to 290 cN/tex, and an initial modulus, based on 100% extension, of more than 50 N/rex, especially 100 to 150 N/rex.

The present invention further provides a process for producing the formed aromatic polyamide structures, especially fibers, defined above, comprising the measures of:

i) preparing a forming solution comprising an organic solvent and at least 2% by weight, in particular 4 to 20% by weight, based on the solution, of an aromatic polyamide as defined above, ii) extruding the forming solution through a forming die into a solvent remover where the organic solvent is at least partly removed from the resulting formed structures to form, with or without drawing, primary structures which are sufficiently mechanically stable for subsequent further processing, iii) optionally washing and/or drawing the primary structures, iv) drying the primary structures, and v) treating the dried formed structures at temperatures of 300° to 500° C., optionally with afterdrawing, so that the strength of the formed structures increases by at least 10%, preferably by more than 50%, based on the strength prior to the treatment.

In the process for preparing the forming solution of the aromatic copolyamide, the solvent used is preferably a solvent of the amide type, in particular the abovementioned solvents of the amide type or a mixture of two or more of the compounds mentioned.

To prepare the forming solution, it is advantageous to keep the concentration of the aromatic copolyamide in a range between 2 and 20% by weight. If necessary, the forming solution may contain an additive for promoting the solubility, in which case it is possible to use at least one metal halide of a metal of groups I and II of the Periodic Table, for example lithium chloride, calcium chloride or magnesium bromide, in a concentration between 0.2 and 10%, preferably between 0.5 and 5%, based on the total weight of the forming solution. The solubility-promoting additive also promotes the stability of the forming solution at elevated temperature.

The forming solution preferably has a viscosity of at least 30 Pa*sec at 25° C.

The forming of the forming solution into a formed article can take place by any suitable dry process, wet process or dry-wet process. In those cases where a wet process is used to form the forming solution, for example into filaments, the forming solution or—in this case—the spinning solution is extruded through a die, for example a spinning die or spinneret, into a coagulating liquid. The forming preferably takes place at a temperature between 25° and 100° C.

It is usually advantageous here for the coagulation liquid to be water or a water-containing solution of a polar organic solvent. This polar organic solvent can be chosen from the same amide solvents which are usually used for dissolving the aromatic copolyamide.

The polar organic solvent in the coagulation liquid is preferably the same solvent which is present in the forming solution. The coagulation liquid is preferably used at a temperature between 0° C. and the boiling point of the coagulation liquid at atmospheric pressure.

The polar organic solvent is preferably present in the coagulation liquid in a concentration between 70% by weight and less, in particular between 50% by weight and less.

The above-explained forming process is particularly suitable for producing films or fibers in the form of a forming solution.

In the production of fibers from the aromatic copolyamide, the forming or spinning solution is extruded through a spinning head with a plurality of spinning orifices, and the filament-shaped streams of the spinning solution are consolidated in one of the above-indicated coagulation liquids (wet process) or in an atmosphere which promotes evaporation (dry process). For spinning it is possible to use a customary horizontal or vertical wet spinning machine, a dry jet wet spinning machine or a spinning machine in which the material flows downward under tension. A similarly useful variant is the dry jet wet spinning process described for example in U.S. Pat. No. 3,414,645.

In wet spinning an aromatic copolyamide according to the present invention, the coagulation preferably takes place using a coagulation liquid containing a coagulation-promoting additive, and this coagulation is followed by a further coagulation step in the course of which the coagulating filaments of the aromatic copolyamide are passed into a water bath which is maintained at a temperature between 0° and 100° C.

The additional coagulation step serves to complete the coagulation by removing the solvent. In addition, coagulation-promoting additives, if used, are washed out of the coagulated filaments.

It is clear from the foregoing description that the aromatic copolyamide of the present invention is simple to process into filaments using customary spinning processes and apparatus without having to use a hazardous or harmful solvent, for example concentrated sulfuric acid.

This reduces the risks to the operating personnel. In addition, the filaments produced from the copolyamide of the present invention have a dense internal structure.

The forming solution can also be processed into a film or sheet using customary fanning-out or extrusion processes.

Fibers or films produced by the above-indicated forming processes are usually subjected to a drawing process which serves to enhance not only the mechanical properties, for example the tensile strength or the modulus of elasticity, but also the thermal properties, for exhale the thermal stability, of the filaments or sheets thus produced.

Filaments of the aromatic copolyamides of the present invention are generally drawn to achieve a high mechanical strength and high modulus of elasticity. The draw ratio is usually within the range from about 3 to 10. The drawing temperature is generally between 350° and 550° C., in particular between 400° and 480° C.

The drawing can be carried out in a single step, in two steps or in more steps, in which case a hot plate or a cylindrical heater can be used for the heating. In addition, the drawn filaments or sheets can be subjected to a further heat treatment at the same or a higher temperature in order to enhance their crystalline structure.

Very particular preference is given to carrying out steps i) to v) of the process of the present invention continuously.

After the formed structures have been dried, they are subjected to a heat treatment. This step serves to improve the mechanical properties, for example to increase tensile strength and modulus of elasticity. These values can rise for example by more than 100%, based on the starting material.

Particular preference is given to a process for producing fibers by winding up the fibers following iv) and subjecting the wound-up fibers separately to a heat treatment, preferably a dry heat treatment, in step v).

Particular preference is further given to a process for producing fibers wherein the heat treatment in step v) is carried out in two steps, the first step involving heating the filaments to temperatures of from 300° to 400° C., especially 320° to 370° C., and the second step involving heating the filaments to temperatures of 400° to 550° C., especially 430° to 480° C.

The heat treatment can be carried out in an oxidizing atmosphere or in a nonoxidizing atmosphere, preferably the heat treatment is carried out in air. The fibers of the present invention customarily have linear densities of 1–10 dtex, preferably 1.5–6.0 dtex.

Trials have shown that the production of formed structures from forming solutions comprising organic solvents instead of concentrated sulfuric acid and aromatic polyamides comprising the structural repeat unit of the above-defined formula I

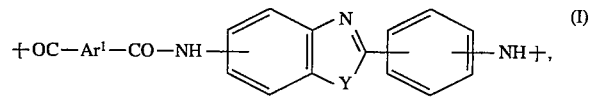

where Y is —O— or —NR$^1$— leads to products which have a low sulfur content. The products obtained have a reduced tendency to hydrolyze.

The present invention therefore also provides a formed structure comprising aromatic polyamides comprising the structural repeat unit of the formula I, having a sulfur content of less than 0.1% by weight, based on the dry substance of the formed structure.

The preferred fiber- and film-forming aromatic polyamides which can be used in this embodiment of the invention include aromatic polyamides consisting of the structural repeat units of the formula I, for example an aromatic polyamide derived from terephthalic acid or its polyamide-forming derivatives and from 5(6)-amino-2-(p-aminophenyl) benzimidazole; or aromatic copolyamides consisting of the structural repeat units of the formulae I and II, for example an aromatic polyamide derived from terephthalic acid or its polyamide-forming derivatives and from diamino-2-phenylbenzimidazole and paraphenylenediamine; or aromatic polyamides consisting of the structural repeat units of the formulae I, II and optionally III, for example an aromatic polyamide derived from terephthalic acid or its polyamide-forming derivatives or from diamino-2-phenylbenzimidazole, para-phenylenediamine and 3,4'-diaminodiphenyl ether or 1,4-bis(4-aminophenyloxy)benzene or 3,3'-dimethylbenzidine.

The fibers composed of an aromatic polyamide according to the present invention, which have excellent mechanical and thermal properties and which are notable for high drawability, can be used industrially in various ways, for example for reinforcing plastics, especially as reinforcing materials for the fabric layers of rubber goods, as heat-resistant isolators, for producing filter fabrics, as lightweight insulants and for producing protective clothing.

Films composed of an aromatic copolyamide according to the present invention can be used as heat-resistant electrical insulators or for producing membranes.

Further properties and advantages of the invention will now be more particularly described by way of example.

It is to be understood, however, that the invention is not restricted to the embodiment examples. On the contrary, a person skilled in the art has on the basis of the embodiment examples numerous possibilities for modifications and/or additions at his or her disposal without having to depart from the basic concept of the invention.

EXAMPLE 1

Aromatic copolyamide of 100 mol % of terephthaloyl chloride (TPC), 40 mol % of diamino-2-phenylbenzimidazole (DABI), 40 mol % of para-phenylenediamine (PPD) and 20 mol % of 3,4'-diaminodiphenyl ether (DADPE). 85.23 g (0.38 mol) of DABI, 41.04 g (0.38 mol) of PPD and 38.04 g (0.19 mol) of DADPE were dissolved in 4,036 g N-methylpyrrolidone (NMP) and admixed at 14° C. with 190.84 g (0.94 mol) of TPC. The desired viscosity was set by adding the remainder of 2.03 g (0.01 mol) of TPC a little at a time. To achieve the desired viscosity (inherent viscosity of 5.5 dl/g), the polycondensation was neutralized with 70.3 g of calcium hydroxide. The solution was subsequently stirred at 80° C. The solution contained 6% by weight of aramid and was filtered, degassed and wet-spun. For this it was spun through a 100 hole spinneret, each hole having a diameter of 0.15 mm, via an air gap into a coagulation bath consisting of a hot solution 35% NMP in water at 50° C., at a speed of 16 m/min. The filaments obtained were drawn through two water baths, a washer, over a dry godet and finally over hot plates at temperatures of 470° C. to an 11-fold multiple.

The filament linear density was 1.8 dtex coupled with a tenacity of 210 cN/tex, a elongation at break of 3.4% and an initial modulus of 85 N/rex, based on 100% extension.

EXAMPLES 2 TO 8

The preparatory method was followed to prepare further aramids, which were then wet-spun. The chemical composition of the aramids prepared, the production and processing conditions and the properties of the filaments obtained are listed in the table below. The key to the monomers used is as follows:

TPC terephthaloyl chloride
DABI 5(6)-amino-2-(p-aminophenyl)benzimidazole
PPD para-phenylenediamine
DADPE 3,4'-diaminodiphenyl ether
BAPOB 1,4-bis(4-aminophenyloxy)benzene
DMB 3,3'-dimethylbenzidine

TABLE

| Example | 2 | 3 | 4 | 5 | 6 | 7 | 8 | 9 | 10 | 11 | 12 |
|---|---|---|---|---|---|---|---|---|---|---|---|
| TPC (mol %) | 100 | 100 | 100 | 100 | 100 | 100 | 100 | 100 | 100 | 100 | 100 |
| PPD (mol %) | 40 | 30 | 30 | — | — | 50 | 25 | 20 | 25 | 25 | 25 |
| DADPE (mol %) | — | 30 | 10 | — | 20 | — | — | — | — | — | — |
| BAPOB (mol %) | — | — | — | — | 10 | 25 | 25 | — | — | — | 20 |
| DMB (mol %) | — | — | — | 40 | — | — | — | 40 | 37.5 | 40 | — |
| DABI (mol %) | 60 | 40 | 60 | 60 | 70 | 25 | 50 | 40 | 37.5 | 35 | 55 |
| Concentration of spinning solution (% by weight) | 4 | 6 | 6 | 5 | 6 | 6 | 6 | 6 | 5.5 | 6 | 6 |
| Inh. viscosity (dl/g) | 4.3 | 5.8 | 5.1 | 4.2 | 5.6 | 6.3 | 6.1 | 7.7 | 8.3 | 7.4 | 7.0 |
| Total linear density (dtex) | 160 | 550 | 550 | 550 | 180 | 180 | 180 | 330 | 500 | 330 | 236 |
| Breaking strength (cN/tex) | 130 | 250 | 210 | 224 | 210 | 230 | 215 | 222 | 220 | 192 | 208 |
| Modulus of elasticity (N/tex) | 114 | 76 | 85 | 99 | 66 | 68 | 50 | 81 | 85 | 79 | 60 |
| Breaking extension (%) | 1.9 | 4.5 | 3.8 | 3.5 | 3.9 | 3.4 | 3.9 | 3.0 | 2.9 | 2.7 | 4.0 |
| Draw ratio 1: | 3 | 13 | 8 | 7 | 10 | 7 | 9 | 3 | 2.5 | 2 | 7 |

What is claimed is:

1. An aromatic copolyamide comprising the structural repeat units of the formulae I, II and III

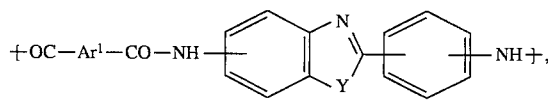 (I)

+OC—Ar²—CO—NH—Ar³—NH+, and (II)

+OC—Ar⁴—CO—NH—Ar⁵—NH+ (III)

where $Ar^1$, $Ar^2$, $Ar^3$ and $Ar^4$ are independently of one another bivalent aromatic radicals whose valence bonds are disposed para or comparably coaxial or parallel to each other, $Ar^5$ is a non-$Ar^3$ bivalent aromatic radical whose valence bonds are disposed para or comparably coaxial or parallel to each other, or $Ar^5$ is a bivalent aromatic radical whose valence bonds are disposed meta or comparably angled to each other, Y is —O—, —S— or —NR¹— where R¹ a univalent organic radical or hydrogen, and $Ar^1$, $Ar^2$, $Ar^3$, $Ar^4$ and $Ar^5$ are independently of one another optionally substituted by one or two radicals inert toward carbonyl chlorides.

2. The aromatic copolyamide of claim 1 wherein $Ar^1$, $Ar^2$ and $Ar^4$ are each 1,4-phenylene.

3. The aromatic copolyamide of claim 1 wherein $Ar^3$ is 1,4-phenylene or a bivalent radical derived from 4,4'-diaminobenzanilide.

4. The aromatic copolyamide of claim 1 wherein $Ar^5$ is a radical of the formula IV —Ar⁶—X—Ar⁷— (IV)

where $Ar^6$ and $Ar^7$ are independently of each other a bivalent aromatic radical whose valence bonds are disposed para or comparably coaxial or parallel to each other, or where $Ar^7$ is additionally a bivalent aromatic radical whose valence bonds are disposed meta or comparably angled to each other, or where $Ar^6$ and $Ar^7$ are independently of each other optionally substituted by one or two radicals inert toward carbonyl chlorides, and X is a direct C—C bond or a group of the formula —O—, —S—, —SO₂—, —O—phenylene—O— or alkylene.

5. The aromatic copolyamide of claim 4 wherein $Ar^3$ is likewise a radical of the formula IV which differs from the particular radical $Ar^5$ chosen.

6. The aromatic copolyamide of claim 1 wherein Y is —S—, —O— or —NH—.

7. The aromatic copolyamide of claim 1 wherein R¹ is $C_1$-$C_6$-alkyl or hydrogen.

8. The aromatic copolyamide of claim 4 wherein $Ar^1$, $Ar^2$ and $Ar^4$ are each 1,4-phenylene, $Ar^3$ is 1,4-phenylene or a bivalent radical of 4,4'-diaminobenzanilide, $Ar^5$ is a radical of the formula IV where $Ar^6$ is 1,4-phenylene optionally substituted by a radical inert toward carbonyl chlorides, $Ar^7$ is 1,4- or 1,3-phenylene optionally substituted by a radical inert toward carbonyl chlorides, and X is a direct C—C bond, —O—, —CH₂— or —O—1,4-phenylene—O—.

9. The aromatic copolyamide of claim 8 wherein $Ar^6$ is 1,4-phenylene, $Ar^7$ is 1,3-phenylene and X is —O—.

10. The aromatic copolyamide of claim 9 wherein the proportions of the structural repeat units of the formulae I to III vary within the following ranges, based on the total amount of these structural units:

structural repeat unit of the formula I: 1–50 mol %, structural repeat unit of the formula II: 20–60 mol %, and structural repeat unit of the formula III: 20–50 mol %.

11. The aromatic copolyamide of claim 8 wherein $Ar^6$ and $Ar^7$ are each 1,4-phenylene and X is —O—1,4-phenylene—O—.

12. The aromatic copolyamide of claim 11 wherein the proportions of the structural repeat units of the formulae I to III vary within the following ranges, based on the total amount of these structural units:

structural repeat unit of the formula I: 1–60 mol %, structural repeat unit of the formula II: 20–40 mol %, and structural repeat unit of the formula III: 10–40 mol %.

13. The aromatic copolyamide of claim 8 wherein $Ar^6$ and $Ar^7$ are each 1,4-phenylene substituted by a radical, inert toward carbonyl chlorides and X is a direct C—C bond.

14. The aromatic copolyamide of claim 13 wherein the proportions of the structural repeat units of the formulae I to III vary within the following ranges, based on the total amount of these structural units:

structural repeat unit of the formula I: 1–70 mol %, structural repeat unit of the formula II: 10–60 mol %, and structural repeat unit of the formula III: 20–60 mol %.

15. The aromatic copolyamide of claim 4 wherein $Ar^1$, $Ar^2$ and $Ar^4$ are each 1,4-phenylene, $Ar^3$ is a radical of the formula IV where $Ar^6$ and $Ar^7$ are each 1,4-phenylene substituted by a radical inert toward carbonyl chlorides, X is a direct C—C bond, $Ar^5$ is a radical of the formula IV where $Ar^6$ is 1,4-phenylene optionally substituted by a radical inert toward carbonyl chlorides, $Ar^7$ is 1,4- or 1,3-phenylene optionally substituted by a radical inert toward carbonyl chlorides, and X is —O—, —CH$_2$— or —O—1,4-phenylene—O—.

16. The aromatic copolyamide of claim 15 wherein $Ar^3$ is a radical of the formula IV where $Ar^6$ and $Ar^7$ are each 1,4-phenylene substituted by a radical inert toward carbonyl chlorides, X is a direct C—C bond, $Ar^5$ is a radical of the formula IV where $Ar^6$ is 1,4-phenylene and $Ar^7$ is 1,3-phenylene, and X is —O—.

17. The aromatic copolyamide of claim 16 wherein the proportions of the structural repeat units of the formulae I to III vary within the following ranges, based on the total amount of these structural units:

structural repeat unit of the formula I: 1–60 mol %, structural repeat unit of the formula II: 20–50 mol %, and structural repeat unit of the formula III: 20–40 mol %.

18. The aromatic copolyamide of claim 15 wherein $Ar^3$ is a radical of the formula IV where $Ar^6$ and $Ar^7$ are each 1,4-phenylene substituted by a radical inert toward carbonyl chlorides, X is a direct C—C bond, $Ar^5$ is a radical of the formula IV where $Ar^6$ and $Ar^7$ are each 1,4-phenylene and X is —O—1,4-phenylene—O—.

19. The aromatic copolyamide of claim 18 wherein the proportions of the structural repeat units of the formulae I to III vary within the following ranges, based on the total amount of these structural units:

structural repeat unit of the formula I: 1–60 mol %, structural repeat unit of the formula II: 20–50 mol %, and structural repeat unit of the formula III: 20–40 mol %.

20. The aromatic copolyamide of claim 4 comprising the structural repeat units of the formula I, II, III and V

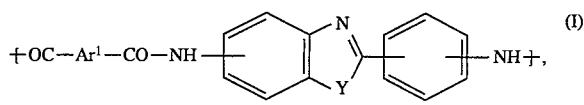

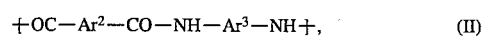

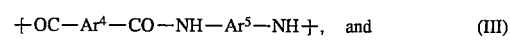

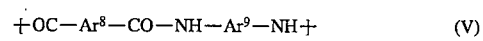

where $Ar^1$, $Ar^2$, $Ar^3$, $Ar^4$ and $Ar^8$ are independently of one another bivalent aromatic radicals whose valence bonds are disposed para or comparably coaxial or parallel to each other, Y is —O—, —S— or $NR^1$— where $R^1$ is a univalent organic radical or hydrogen, and $Ar^5$ and $Ar^9$ are independently of each other different radicals of the formula IV

where $Ar^6$, $Ar^7$ and X are each as defined in claim 4.

21. The aromatic copolyamide of claim 20 wherein $Ar^1$, $Ar^2$, $Ar^4$ and $Ar^8$ are each 1,4-phenylene, $Ar^3$ is 1,4-phenylene or a bivalent radical of 4,4'-diaminobenzanilide, $Ar^6$ is 1,4-phenylene optionally substituted by a radical inert toward carbonyl chlorides, $Ar^7$ is 1,4- or 1,3-phenylene optionally substituted by a radical inert toward carbonyl chlorides and X is a direct C—C bond, —O—, —CH$_2$— or —O—1,4-phenylene—O—.

22. The aromatic copolyamide of claim 21 wherein $Ar^5$ is a radical of the formula IV where $Ar^6$ and $Ar^7$ are each 1,4-phenylene and X is —O—1,4-phenylene—O— and $Ar^9$ is a radical of the formula IV where $Ar^6$ is 1,4-phenylene, $Ar^7$ is 1,3-phenylene and X is —O—.

23. The aromatic copolyamide of claim 22 wherein the proportions of the structural repeat units of the formulae I to III and V vary within the following ranges, based on the total amount of these structural units:

structural repeat unit of the formula I: 1–15 mol %, structural repeat unit of the formula II: 40–60 mol %, structural repeat unit of the formula III: 1–30 mol %, and structural repeat unit of the formula V: 15–45 mol %.

24. The aromatic copolyamide of claim 20 wherein $Ar^5$ is a radical of the formula IV where $Ar^6$ and $Ar^7$ are each 1,4-phenylene and X is —O—1,4-phenylene—O— and $Ar^9$ is a radical of the formula IV where $Ar^6$ and $Ar^7$ are each 1,4-phenylene substituted by a radical, inert toward carbonyl chlorides, and X is a direct C—C bond.

25. The aromatic copolyamide of claim 24 wherein the proportions of the structural repeat units of the formulae I to III and V vary within the following ranges, based on the total amount of these structural units:

structural repeat unit of the formula I: 1–15 mol %, structural repeat unit of the formula II: 10–40 mol %, structural repeat unit of the formula III: 10–35 mol %, and structural repeat unit of the formula V: 30–60 mol %.

26. The aromatic copolyamide of claim 20 wherein $Ar^1$, $Ar^2$, $Ar^4$ and $Ar^8$ are each 1,4-phenylene, $Ar^3$ is 1,4-phenylene or a bivalent radical of 4,4'-diaminobenzanilide, $Ar^5$ is a radical of the formula IV where $Ar^6$ and $Ar^7$ are each 1,4-phenylene substituted by a radical, inert toward carbonyl chlorides, and X is a direct C—C bond, and $Ar^9$ is a radical of the formula IV where $Ar^6$ is 1,4-phenylene, $Ar^7$ is 1,3-phenylene and X is —O—.

27. The aromatic copolyamide of claim 26 wherein the proportions of the structural repeat units of the formulae I to III and V vary within the following ranges, based on the total amount of these structural units:

- structural repeat unit of the formula I: 1–15 mol %,
- structural repeat unit of the formula II: 10–40 mol %,
- structural repeat unit of the formula III: 30–60 mol %, and
- structural repeat unit of the formula V: 10–35 mol %.

28. A process for producing the aromatic copolyamide comprising the structural repeat units I, II and III of claim 1, which comprises reacting a dicarbonyl dichloride of the formula VI or a mixture of such dicarbonyl dichlorides with a mixture of the diamines of the formulae VII, VIII and IX $$ClOC-Ar^1-COCl, \qquad (VI)$$

$$H_2N-\underset{}{\underset{}{\bigcirc}}\underset{Y}{\overset{N}{\diagdown}}\underset{}{\underset{}{\bigcirc}}-NH_2, \qquad (VII)$$

$H_2N-Ar^3-NH_2$ (VIII), $H_2N-Ar^5-NH_2$ (IX), where each of the Ar radicals and Y are as defined in claim 1.

29. A formed structure comprising aromatic polyamides as claimed in claim 1.

30. The formed structure of claim 29 comprising fibers having a tensile strength of more than 100 cN/tex and an initial modulus, based on 100% extension, of more than 60 N/tex.

31. A process for producing the formed aromatic polyamide structures of claim 29, comprising the measures of:
   i) preparing a forming solution comprising an organic solvent and at least 2% by weight, based on the solution, of the aromatic polyamide,
   ii) extruding the forming solution through a forming die into a solvent remover where the organic solvent is at least partly removed from the resulting formed structures to form, with or without drawing, primary structures which are sufficiently mechanically stable for subsequent further processing,
   iii) optionally washing and/or drawing the primary structures,
   iv) drying the primary structures, and
   v) treating the dried formed structures at temperatures of 300° to 500° C., optionally with afterdrawing, so that the strength of the formed structures increases by at least 10%, based on the strength prior to the treatment.

32. The process of claim 31 wherein the forming solution has a viscosity of at least 30 Pa*sec at 25° C. and is extruded, at a temperature between 25° and 100° C.

33. The process of claim 31 wherein the forming solution used is directly the solution obtained in the production of the aromatic polyamide.

34. The process of claim 31 wherein the solvent remover used comprises a coagulation bath, preferably containing as coagulation liquid a mixture of the organic solvent used in the forming solution with water and/or with an aliphatic alcohol.

35. The process of claim 31 wherein steps i) to v) are carried out continuously.

36. The process of claim 31 for producing fibers, further comprising winding up the fibers obtained following iv) and subjecting the wound-up fibers separately to a heat treatment, in step v).

37. The process of claim 31 for producing fibers wherein the heat treatment in step v) is carried out in two steps, the first step comprising heating the filaments to temperatures of from 300° to 400° C. and the second step comprising heating the filaments to temperatures of 400° to 550° C.

38. A formed structure comprising aromatic polyamides comprising the structural repeat unit of the formula I $$-[OC-Ar^1-CO-NH-\underset{}{\underset{}{\bigcirc}}\underset{Y}{\overset{N}{\diagdown}}\underset{}{\underset{}{\bigcirc}}-NH]-, \qquad (I)$$

having a sulfur content of less than 0.1% by weight, based on the dry substance of the formed structure.

39. The formed structure of claim 38 wherein the aromatic polyamide consists of structural repeat units of the formula I where $Ar^1$ is a bivalent aromatic radical whose valence bonds are disposed para or comparably coaxial or parallel to each other and is optionally substituted by one or two radicals inert toward carbonyl chlorides and Y is $-O-$, $-S-$ or $-NR^1-$ where $R^1$ is a univalent organic radical or hydrogen.

40. The formed structure of claim 38 wherein the aromatic polyamide consists of structural repeat units of the formulae I, II and optionally III $$-[OC-Ar^2-CO-NH-Ar^3-NH]- \qquad (II)$$

and $$-[OC-Ar^4-CO-NH-Ar^5-NH]- \qquad (III)$$

where $Ar^1$, $Ar^2$, $Ar^3$ and $Ar^4$ are independently of one another bivalent aromatic radicals whose valence bonds are disposed para or comparably coaxial or parallel to each other, $Ar^5$ is a non-$Ar^3$ bivalent aromatic radical whose valence bonds are disposed para or comparably coaxial or parallel to each other, or $Ar^5$ is a bivalent aromatic radical whose valence bonds are disposed meta or comparably angled to each other, Y is $-O-$, $-S-$ or $-NR^1-$ where $R^1$ is a univalent organic radical or hydrogen, and $Ar^1$, $Ar^2$, $Ar^3$, $Ar^4$ and $Ar^5$ are independently of one another optionally substituted by one or two radicals inert toward carbonyl chlorides.

41. A process for producing the aromatic copolyamide comprising the structural repeat units I, II, III and V of claim 20, which comprises reacting a dicarbonyl dichloride of the formula VI or a mixture of such dicarbonyl dichlorides with a mixture of the diamines of the formulae VII, VIII, IX and X $$ClOC-Ar^1-COCl, \qquad (VI)$$

$$H_2N-\underset{}{\underset{}{\bigcirc}}\underset{Y}{\overset{N}{\diagdown}}\underset{}{\underset{}{\bigcirc}}-NH_2, \qquad (VII)$$

$H_2N-Ar^3-NH_2$(VIII), $H_2N-Ar^5-NH_2$(IX), $H_2N-Ar^9-NH_2$(X), where each of the Ar radicals and Y are as defined in claim 20.

42. The formed structure of claim 29 wherein the structure is a film.

43. The formed structure of claim 29 wherein the structure is a fiber.

* * * * *

UNITED STATES PATENT AND TRADEMARK OFFICE
CERTIFICATE OF CORRECTION

PATENT NO. : 5,571,891
DATED : November 05, 1996
INVENTOR(S) : JUNG ET AL.

It is certified that error appears in the above-indentified patent and that said Letters Patent is hereby corrected as shown below:

Col. 18, Claim 38, line 10, before "having", add — and —.

Col. 18, Claim 38, line 11, after "structure", add —, where $Ar^1$ is a bivalent aromatic radical whose valence bonds are disposed para or comparably coaxial or parallel to each other and is optionally substituted by one or two radicals inert toward carbonyl chlorides and Y is -O- or -$NR^1$-where $R^1$ is univalent organic radical or hydrogen—.

Signed and Sealed this

Eighteenth Day of February, 1997

Attest:

BRUCE LEHMAN

*Attesting Officer*     *Commissioner of Patents and Trademarks*